United States Patent
Pietschmann

(10) Patent No.: US 9,858,734 B2
(45) Date of Patent: Jan. 2, 2018

(54) MOTOR VEHICLE HAVING A DRIVER IDENTIFICATION DEVICE AND DRIVER IDENTIFICATION SIGNAL TRANSMITTER

(71) Applicant: Bayerische Motoren Werke Aktiengesellschaft, Munich (DE)

(72) Inventor: Ingolf Pietschmann, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/158,695

(22) Filed: May 19, 2016

(65) Prior Publication Data

US 2016/0260269 A1    Sep. 8, 2016

Related U.S. Application Data

(63) Continuation of application No. PCT/EP2014/074478, filed on Nov. 13, 2014.

(30) Foreign Application Priority Data

Nov. 20, 2013    (DE) .................. 10 2013 223 680

(51) Int. Cl.
*G07C 9/00* (2006.01)
*G06Q 30/02* (2012.01)
*H04W 4/00* (2009.01)
*H04W 84/12* (2009.01)

(52) U.S. Cl.
CPC ......... *G07C 9/00031* (2013.01); *G06Q 30/02* (2013.01); *G06Q 30/0269* (2013.01); *G07C 9/00309* (2013.01); *G07C 2009/00412* (2013.01); *H04W 4/008* (2013.01); *H04W 84/12* (2013.01)

(58) Field of Classification Search
CPC ............... G06Q 30/02; G06Q 30/0269; G06Q 30/0247; G07C 9/00031; G07C 9/00309
See application file for complete search history.

(56) References Cited

U.S. PATENT DOCUMENTS

| | | | |
|---|---|---|---|
| 2004/0104823 A1* | 6/2004 | Chainer | G07C 5/008 340/933 |
| 2004/0217852 A1 | 11/2004 | Kolls | |
| 2007/0061190 A1 | 3/2007 | Wardell | |

(Continued)

FOREIGN PATENT DOCUMENTS

| | | |
|---|---|---|
| DE | 10 2012 220 244 A1 | 5/2013 |
| EP | 1 053 538 B1 | 6/2002 |
| WO | WO 2013/101046 A1 | 7/2013 |

OTHER PUBLICATIONS

International Search Report (PCT/ISA/210) issued in PCT Application No. PCT/EP2014/074478 dated Feb. 12, 2015, with English translation (six (6) pages).

(Continued)

*Primary Examiner* — Nabil Syed
(74) *Attorney, Agent, or Firm* — Crowell & Moring LLP

(57) ABSTRACT

In a motor vehicle, a driver of the vehicle can identify himself or herself. A vehicle driver signal specific to the driver of the vehicle is then generated and transmitted by the motor vehicle by way of a transmitter. This allows devices situated in the vicinity of the vehicle to respond individually to a driver of a vehicle and to supply him or her with corresponding information.

10 Claims, 6 Drawing Sheets

(56) References Cited

U.S. PATENT DOCUMENTS

| | | | |
|---|---|---|---|
| 2009/0299857 A1* | 12/2009 | Brubaker | G06Q 30/02 705/14.66 |
| 2013/0066720 A1 | 3/2013 | Schwarz et al. | |
| 2013/0131918 A1* | 5/2013 | Hahne | G06F 17/00 701/36 |
| 2013/0132172 A1 | 5/2013 | Liu et al. | |

OTHER PUBLICATIONS

German Search Report issued in counterpart German Application No. 10 2013 223 680.8 dated Jul. 9, 2015, with partial English translation (fifteen (15) pages).

* cited by examiner

MOTOR VEHICLE HAVING A DRIVER IDENTIFICATION DEVICE AND DRIVER IDENTIFICATION SIGNAL TRANSMITTER

CROSS REFERENCE TO RELATED APPLICATIONS

This application is a continuation of PCT International Application No. PCT/EP2014/074478, filed Nov. 13, 2014, which claims priority under 35 U.S.C. §119 from German Patent Application No. 10 2013 223 680.8, filed Nov. 20, 2013, the entire disclosures of which are herein expressly incorporated by reference.

BACKGROUND AND SUMMARY OF THE INVENTION

The invention relates to a motor vehicle, in particular to a motor vehicle having means for personalizing the motor vehicle.

Motor vehicles in which different settings are stored for different vehicle drivers are known. The settings of electrically adjustable mirrors, electrically adjustable seats and/or an audio system can be stored in a manner specific to particular vehicle drivers. A vehicle driver is identified in his vehicle by means of his key. The key is an electronic key which communicates with the control device of the motor vehicle when the vehicle is opened. The vehicle key contains a particular identification feature. This identification feature is transmitted to the electronic control device of the motor vehicle when the motor vehicle is opened. The control device then loads the parameters associated with this identification feature and adjusts the mirrors, seats and the audio system, for example, in the manner in which this vehicle driver left it the last time he used the motor vehicle. Different vehicle drivers who jointly use a motor vehicle should use different keys, so that they always obtain their individual settings in the motor vehicle.

EP 1 053 538 B1 discloses an advertising system containing different advertising messages. It has an apparatus for determining one or more advertising-specific parameters in the form of a particular feature of persons to whom advertising is to be disseminated. This feature may be, for example, the language used by a person in the vicinity of the advertising system. A further feature is the automobile brand of the motor vehicle driven by a person in the vicinity of the advertising system. These parameters can be independently detected by the determination apparatus. Individual advertising messages can be displayed on the advertising system on the basis of these parameters.

US 2007/0061190 A1 discloses a method in which features relating to the sales behavior of particular persons are collected on the Internet and personalized advertising messages are transmitted to these persons according to these features.

The invention is based on the object of developing a motor vehicle and a method in such a manner that the use of the motor vehicle is more convenient for the vehicle driver than in conventional motor vehicles.

This and other objects are achieved in accordance with embodiments of the invention.

A motor vehicle according to the invention includes: a vehicle driver identification device for identifying a vehicle driver; a signal generation device for generating a signal which is specific to the vehicle driver and is assigned by the vehicle driver identification device; and a transmitter which can be used to emit the signal specific to the vehicle driver, with the result that devices in the vicinity of the motor vehicle can specifically react to the presence of the vehicle driver.

The motor vehicle emits a signal specific to the vehicle driver, with the result that devices in the vicinity of the motor vehicle can gather parameters and information specific to the vehicle driver from this specific vehicle driver signal and can therefore react according to the requirements of the vehicle driver. The specific parameters and information may comprise, inter alia, the age, the sex, the language, the height, the weight of the vehicle driver and information relating to specific interests and hobbies. However, these parameters and this information may also have information relating to the destination to which the vehicle driver is headed and/or his planned activities.

Typical devices which can process such information are traffic and parking guidance systems, for example. If a vehicle driver is registered for an event, for example a trade fair, or has booked a holiday in a hotel, a parking guidance system at the trade fair or the hotel can recognize the vehicle driver and can direct him to his prereserved parking space by means of corresponding automatic signposting. If necessary, particular information relating to where the vehicle driver should register or check in can also be transmitted to him in situ. This is particularly advantageous for vehicle drivers in environments with which they are not familiar. Such a parking guidance system is also particularly advantageous in large companies having a plurality of parking garages or parking facilities distributed over a certain region, with the result that a visitor can be automatically directed to the parking facility most favorable for him.

Further devices are advertising displays and general information displays which can display information specific to the vehicle driver. The information output or displayed on the displays may be, in particular, information adapted to his individual requirements and/or to his individual and, in particular, current situation.

If a vehicle driver is recognized at the particular destination, persons waiting for him can be automatically informed of his presence and can meet him in situ. Such a device is advantageous, for example, for large companies in which visitors should not roam over the company premises without being accompanied, at least as far as possible. On the other hand, the vehicle driver is immediately personally received, which spares him an unpleasant search.

If a vehicle driver has a disabled status, he can be automatically directed to a free disabled parking space. The same applies to women's parking spaces, reserved parking spaces on a ferry or on an automobile train, at an airport terminal or the like.

If there are temporary traffic obstructions, for example as a result of accidents or bad weather, the individual motor vehicles can be individually diverted, in particular if the vehicle driver signal contains the destination, in which case further parameters such as vehicle size (automobile, truck), drive type (two-wheel drive, four-wheel drive), etc. can also be taken into account.

An aspect of the present invention is that, by emitting the specific signal, the vehicle driver can be identified by his environment, with the result that special information or services can be supplied to him. This considerably increases the convenience of using the motor vehicle in comparison with conventional motor vehicles which do not transmit a specific vehicle driver signal.

The vehicle driver can be identified by use of an electronic vehicle key at the vehicle driver identification device. Alternatively or additionally, provision may also be made of a biometric sensor which senses a fingerprint, a face and/or an iris structure. Additionally or alternatively, a radio sensor for reading an electronic identification card, for example an electronic identity card, may also be provided. The vehicle driver can also be identified by inputting an individual code on an input device in the motor vehicle. The biometric sensors and the radio sensor for reading an electronic identification card are preferred since they provide a high degree of protection against tampering and a high degree of interference reliability. As a result, it becomes difficult for third parties to be identified as a different vehicle driver in the motor vehicle without permission.

The signal generation device is preferably connected to a data memory which stores data specific to one or more vehicle drivers. If the vehicle driver is determined using the vehicle driver identification device, the signal generation device can read the data specific to the respectively determined vehicle driver from the data memory. These data are used when generating the specific vehicle driver signal.

The transmitter is designed to emit a radio signal, in particular a radio signal according to a predetermined standard. Such a standard is, for example, WLAN according to IEEE802.11a, IEEE802.11b, IEEE802.11ac, IEEE802.11ad, IEEE802.11g, IEEE802.11h, IEEE802.11n or Bluetooth, in particular Bluetooth V2.0, Bluetooth V3.0 or Bluetooth V4.0.

The motor vehicle may be provided with a receiver in order to carry out bidirectional communication with the devices together with the transmitter. A device may be classified as being in the vicinity of the motor vehicle, in particular, when the respective transmitters and receivers of the motor vehicle and of the device can set up a communication connection to one another on the basis of their transmitting or receiving power. Their proximity to one another can also be determined, in particular, by their respective geographical coordinates and the respective distances from one another. The motor vehicle and the device can be classified as being in the vicinity of one another when their distance undershoots a predetermined upper limit value.

A system according to the invention includes such a motor vehicle and a device which can receive the specific vehicle driver signal and can individually react on the basis of the parameters or information contained therein. The device has a receiver for receiving the specific vehicle driver signal and a signaling device in order to be able to transmit a signal to the vehicle driver. This signal may be an optical and/or acoustic signal, for example.

In accordance with the method according to the invention, a vehicle driver identification device of the motor vehicle is first of all used to identify a vehicle driver of a motor vehicle, and a signal generation device is used to generate a vehicle driver signal specific to the identified vehicle driver. The specific vehicle driver signal is emitted using a transmitter, with the result that devices in the vicinity of the motor vehicle can specifically react to the presence of the vehicle driver.

A signal which is not specific to the vehicle driver and indicates only that information specific to the vehicle driver is available is preferably first of all emitted, in which case, after receiving a device signal from a device in the vicinity of the motor vehicle, the device is identified using the device signal, the signal specific to the vehicle driver being emitted to the device after successful identification and checking of the device.

Instead of a signal which is not specific to the vehicle driver, it is also possible to emit a vehicle driver signal which is specific to the vehicle driver and initially contains only a reduced set of parameters and information relating to the vehicle driver, and a complete or extended set of information and parameters is transmitted to the respective device only when the device is identified. The motor vehicle can therefore provide the devices with individually different information. The devices can also request certain information from the motor vehicle if necessary.

A device may also have a plurality of receivers and transmitters which are networked to one another, in particular, along a particular road, for example a freeway, with the result that data can be interchanged between the motor vehicle and the device over a relatively long period.

The specific vehicle driver signal is preferably emitted only if a device has been identified as an authorized device or as a member of a group of authorized devices. This avoids personal information being passed on to unauthorized third parties.

Communication between the motor vehicle and the device is preferably carried out in encrypted form. Such encryption methods are known. An encryption method with public keys (for example RSA encryption) is appropriate for the present system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 2:
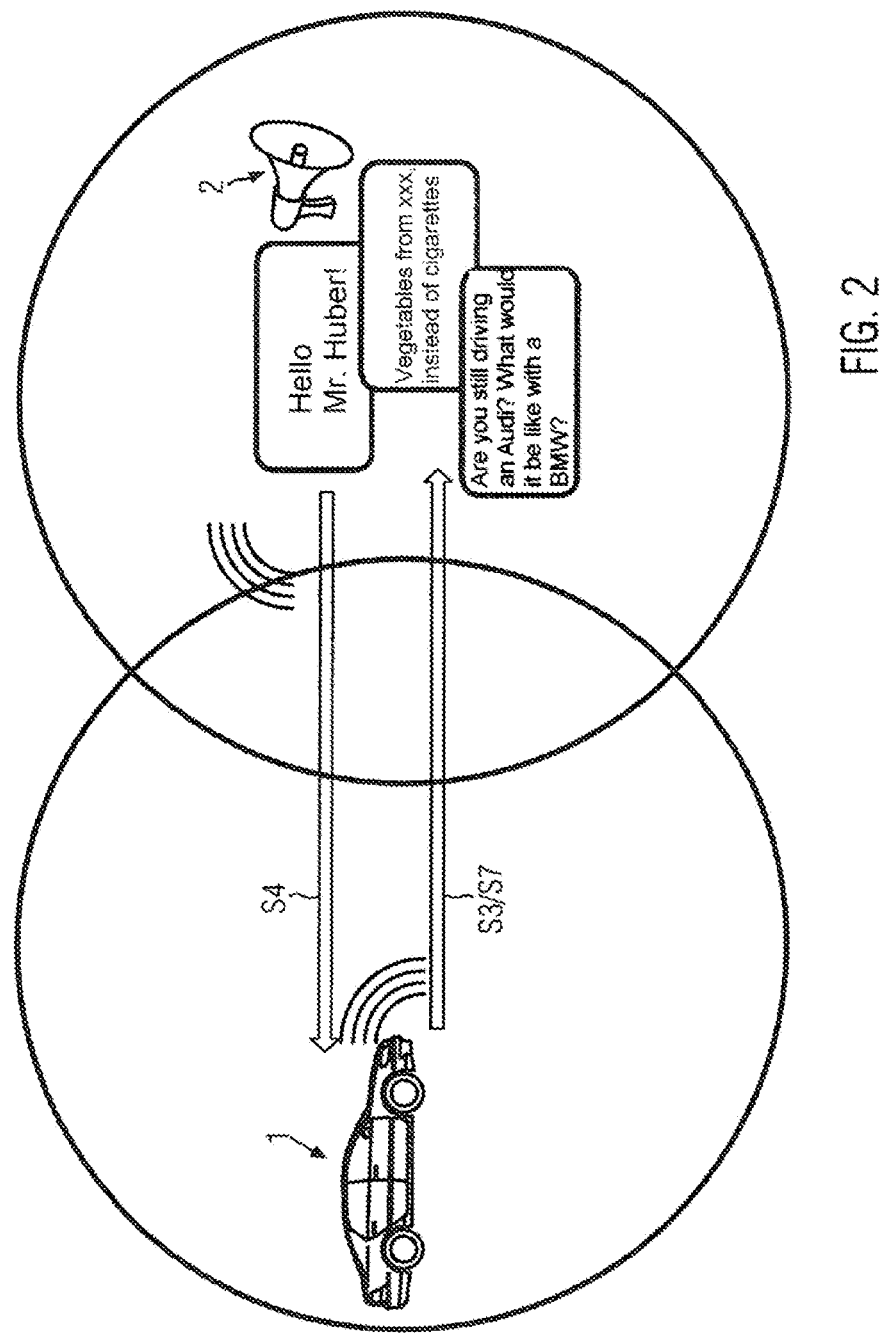
FIG. 2 schematically shows a block diagram of the principle of communication between a motor vehicle and a device according to a first exemplary embodiment of the present invention.

A motor vehicle 1 according to the invention is designed to transmit a signal specific to the vehicle driver, i.e., a vehicle driver signal, with the result that a device 2 can receive this vehicle driver signal and can react in accordance with the vehicle driver signal (FIG. 2).

Figure 1:
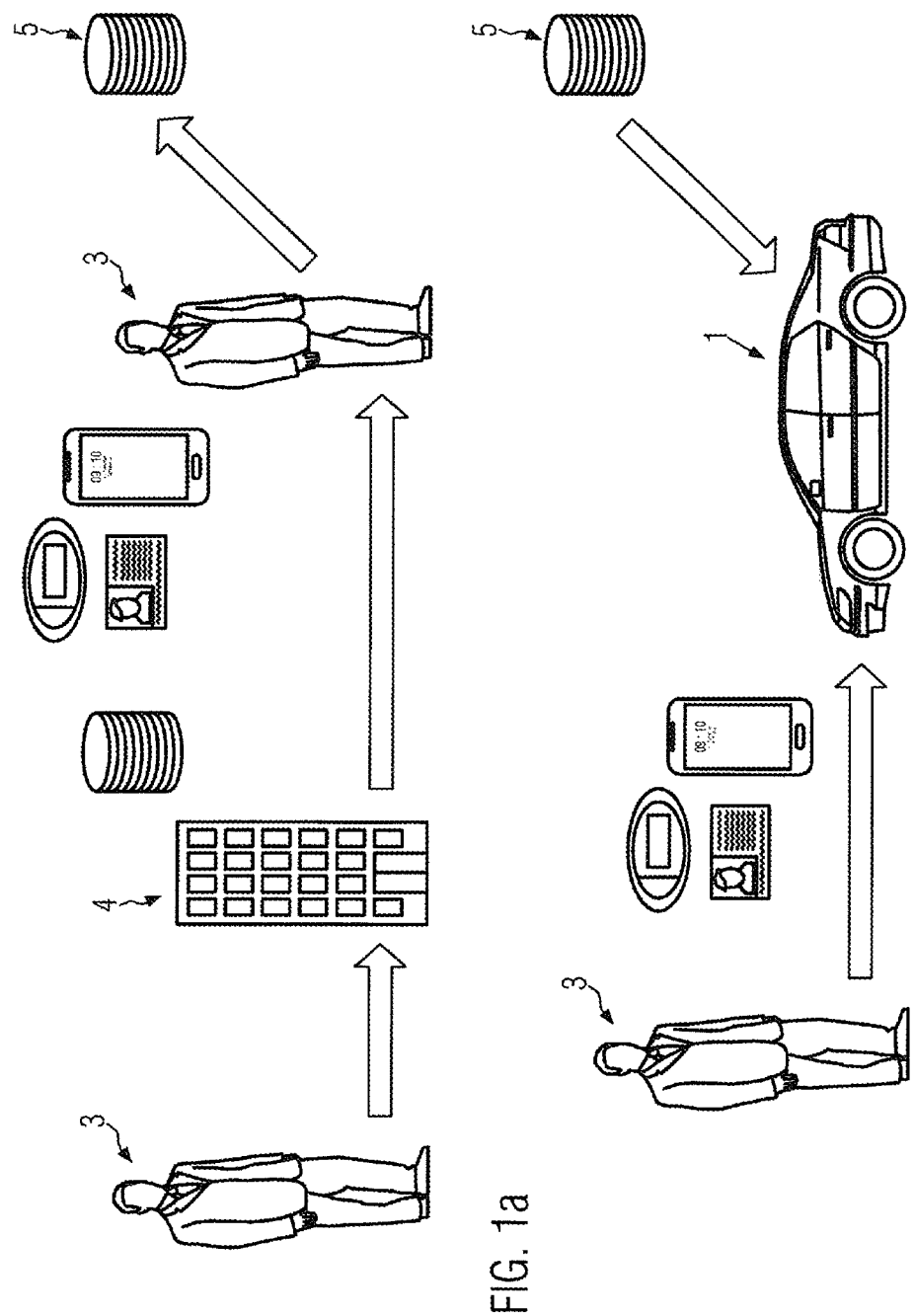
FIGS. 1a and 1b schematically show the sequences for preprocessing and loading user-specific data.

So that the information specific to a vehicle driver 3 is available, the information is preprocessed and is assigned to an identification tag (FIG. 1a). The vehicle driver 3 first of all procures a unique identification number from a registration authority 4. Suitable registration authorities 4 are, for example, certification authorities which issue electronic certificates, or authorities or banks which issue electronically readable documents with an identification number. The identification number of an electronically readable identity card or passport or of a credit or bank card can be used.

The vehicle driver 3 uses this identification number to create a profile containing the data specific to him. These profile data include physical properties such as sex, language, height, weight, age. These data may also include information relating to personal interests and hobbies. This profile may also have specific data relating to the motor vehicle 1 belonging to the vehicle driver 3. The profile is created using appropriate software which assists the vehicle driver 3 when inputting the data. Different confidentiality levels and/or groups of receivers which can receive the respective data can be assigned to the individual data. Particular service providers such as automobile repair shops, hotels, event companies can read data which are useful to them, for example, but are not intended to be transmitted to an advertising service provider, for example. The vehicle driver 3 can therefore appropriately configure his profile and can release the data.

The created data profile is stored in a data memory 5 and is linked to the identification number of the vehicle driver 3. The data memory 5 may be a personal computer belonging to the vehicle driver 3, a server in a WAN, in particular on the Internet, a portable data memory, for example a memory stick or a mobile telephone. In particular, the data memory 5 may also be a data memory which is directly provided by the registration authority 4, for example a server available on the Internet.

In a first exemplary embodiment (FIGS. 2 and 3), the profile is transmitted to a data memory 6 (M) of the motor vehicle 1. If the motor vehicle 1 has an Internet connection, the profile can be directly transmitted from a server to the data memory 6 of the motor vehicle 1 via the Internet. However, the data profile can also be transmitted to the data memory 6 via a data interface in the motor vehicle 1. If a mobile telephone is used as the data memory 5 for storing the data profile, the mobile telephone can be connected to the motor vehicle 1 via an interface and can act as a data memory for the profile data. In this case, there is no need for additional transmission to a data memory 6 locally arranged in the motor vehicle 1.

In the first exemplary embodiment of the present invention, the profile data are therefore available in the motor vehicle 1, in which case they are either stored in a local data memory 6 in the motor vehicle 1 or are connected to the motor vehicle 1 or its electronic control device by means of a portable memory, for example a mobile telephone.

Figure 3:
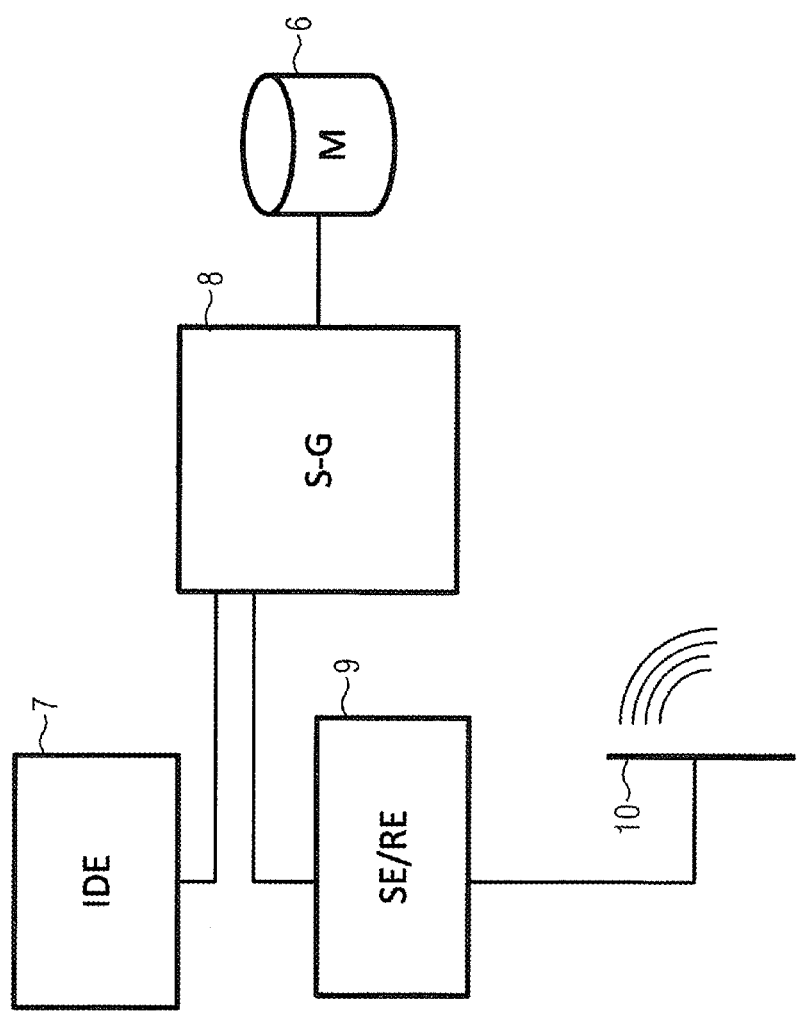
FIG. 3 shows an apparatus which is arranged in a motor vehicle and is intended to generate and transmit a vehicle driver signal specific to the vehicle driver.

The motor vehicle 1 has a vehicle driver identification device 7 (IDE in FIG. 3). In the present exemplary embodiment, the vehicle driver identification device 7 comprises a radio sensor for reading the identification number of the identity card belonging to the vehicle driver 3. When getting into the motor vehicle 1, the vehicle driver 3 is therefore identified by the vehicle driver identification device 7 on the basis of his identity card.

However, the vehicle driver identification device 7 may also alternatively or additionally have other devices, for example a biometric sensor for recognizing a face, the iris structure and/or a fingerprint. The vehicle driver identification device 7 may also include an input device for inputting a predetermined code (token). In one preferred exemplary embodiment, an identification number is stored in a portable data memory, in particular a mobile telephone, the portable data memory being connected to the vehicle driver identification device 7 via a data connection when the driver gets into the motor vehicle 1, with the result that the vehicle driver identification device 7 can read and check the identification number. The data connection between the portable data storage medium and the vehicle driver identification device 7 may be a radio data connection (in particular Bluetooth) or a wired data connection.

The use of a portable data storage medium, for example a mobile telephone, as the memory for the identification number and the profile is particularly convenient for the vehicle driver 3 since he can be identified using a device in a motor vehicle 1 and can provide his profile data. In this case, however, it is expedient to provide a further security mechanism which is used to check whether the correct owner of the portable data storage medium or mobile telephone is actually the person who is identified in the respective motor vehicle 1. This can be carried out by means of a request to input a security code or by capturing biometric data linked to the identification number on the portable data storage medium.

The vehicle driver identification device 7 is connected to a signal generation device 8 (S-G in FIG. 3). The signal generation device 8 can be used to generate a vehicle driver signal specific to the identified vehicle driver 3. The signal generation device 8 is therefore connected to the data memory 6 installed in the motor vehicle 1 in order, after identifying the vehicle driver 3, to read the profile data associated with him.

The signal generation device 8 is connected to a transmitting/receiving device 9 which is connected to an antenna 10 for transmitting and receiving radio signals.

Figure 4:
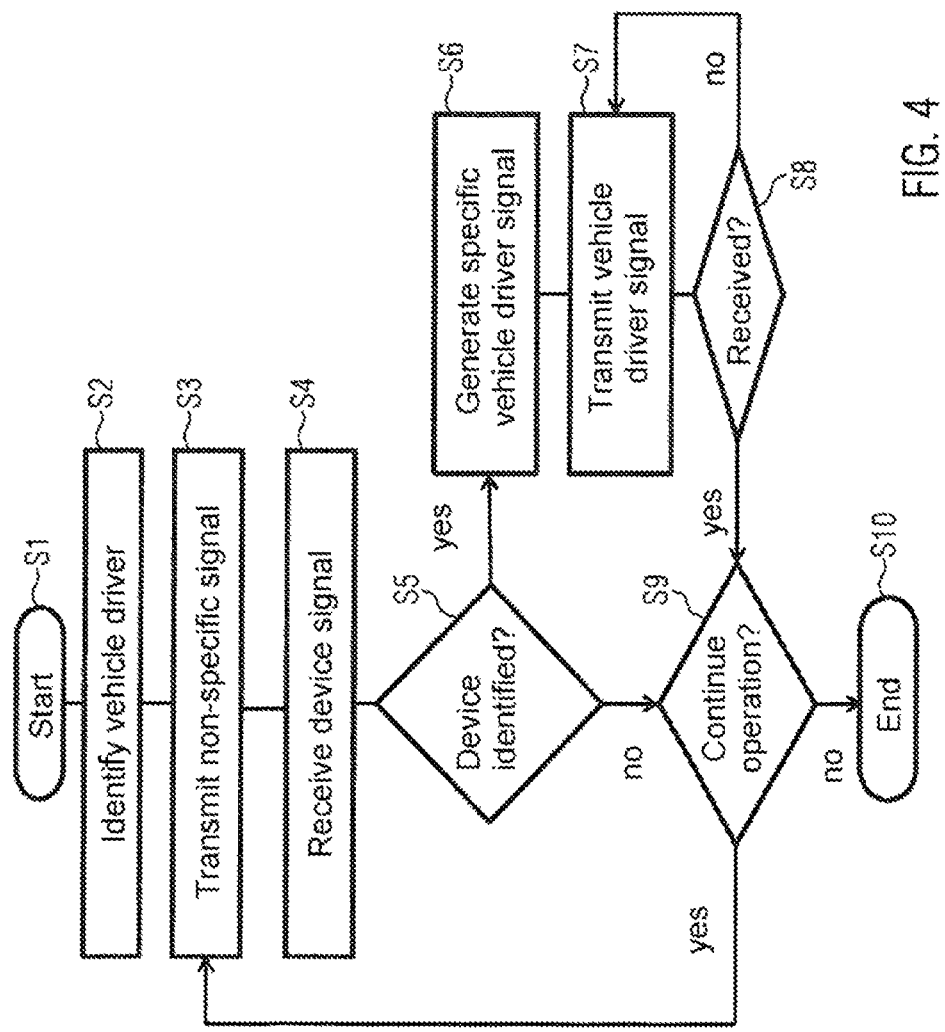
FIG. 4 is a flowchart of the method used in the first exemplary embodiment.

A method for transmitting the specific vehicle driver signal is explained below using FIG. 4. The method begins with step S1.

In step S2, the vehicle driver 3 is identified using the vehicle driver identification device 7. This provides an identification number which is unique for the vehicle driver 3.

In step S3, the signal generation device 8 generates a signal which is initially not specific to the vehicle driver 3 and is transmitted via the transmitting/receiving device 9 and the antenna 10. This non-specific signal contains an item of information signifying that communication can be established with a further device, during which further information, in particular specific information, can possibly be transmitted.

The signal which is not specific to the vehicle driver 3 is transmitted continuously and independently of the position of the motor vehicle 1. However, the signal generation device 8 may also be configured in such a manner that it transmits the signal which is not specific to the vehicle driver 3 only at particular positions of the motor vehicle 1 at which the presence of a device 2 is expected. The signal generation device 8 can determine the information relating to the presence of the devices 2 in the environment of the motor vehicle 1, for example, by comparing the current position data determined by a navigation system of the motor vehicle 1 with the data in a database which stores position data relating to the devices 2.

If a device 2 receives such a signal, the device 2 itself emits a signal which is used to identify the device 2. An attempt is therefore made in step S4 to receive a corresponding device signal via the antenna 10 and the transmitting/receiving device 9 of the motor vehicle 1.

In step S5, a check is carried out in order to determine whether it was possible to identify a device 2. If this is the case, the method sequence changes to step S6 in which a vehicle driver signal specific to the vehicle driver 3 is generated. The vehicle driver signal can be individually adapted to the identified device 2. If the device 2 is, for example, a parking guidance system at a hotel in which the vehicle driver 3 has booked a parking space or a room, the transmission of the name of the vehicle driver 3 alone suffices. This should suffice to uniquely identify the vehicle driver 3 using the booking data stored in the computer system belonging to the hotel and to supply him with the corresponding services. In contrast, if the device 2 is a vehicle guidance system along a road, it is not necessary to transmit the name of the vehicle driver 3, but rather considerably more expedient to transmit the destination of the vehicle driver 3 with the specific vehicle driver signal. The destination can be transmitted in the form of a statement of location or else as an identifier of a particular event which the vehicle driver 3 wishes to attend. In contrast, if the device 2 is part of a person search system which executes particular search messages, it is again useful to transmit the name of the vehicle driver 3. If the device 2 is part of an advertising device, it may again be useful, in contrast, to transmit specific data. In this case, it may also be expedient to also transmit profile data relating to the passengers in addition to the profile data relating to the vehicle driver 3. If a family with two children is sitting in a motor vehicle 1, it is very advantageous for the family if it is advised of a family pass for a swimming pool, ski area or the like via a corresponding advertising device, for example. Such advertising information is very advantageous for the vehicle occupants, which is why it may be in their interest to transmit personal information to appropriate advertising devices.

The vehicle driver signal generated in this manner is transmitted in step S7.

In step S8, a check is carried out in order to determine whether the signal has been received by the corresponding device 2, in which case the device 2 transmits a corresponding confirmation of receipt which in turn can be received by the motor vehicle 1. If it is determined in step S8 that the vehicle driver signal has not been received, the method sequence returns to step S7 and the vehicle driver signal is emitted again.

Step S8 has a time-out function or a maximum repetition rate, with the result that an endless loop is not produced in the event of unsuccessful transmission of the vehicle driver signal.

If, in contrast, it is determined in step S8 that the vehicle driver signal has been received by the device 2, the method sequence changes to step S9. In step S9, a check is carried out in order to determine whether the operation of this apparatus for electronically identifying the vehicle driver 3 by means of the vehicle driver signal is intended to be continued further. If this is the case, the method sequence changes to step S3 again in which a non-specific signal is emitted again.

If it is determined in step S5 that it was not possible to identify a device 2, the method sequence changes to step S9 without generating a vehicle driver signal, in which step a check is carried out in order to determine whether operation is intended to be continued.

If it is determined in step S9 that the operation of the apparatus is no longer intended to be continued, the method sequence changes to step S10 which is used to terminate the method. Step S10 is typically reached at the end of the journey.

The method is typically carried out repeatedly during the entire journey duration.

According to the first exemplary embodiment, a non-specific signal is therefore emitted without request (step S3) and, if a device 2 which can be identified and would like to receive more detailed information relating to the vehicle driver 3 or the further occupants then responds (steps S4, S5), an accordingly specific vehicle driver signal is generated (S6) and transmitted (S7). Signals which are specific to the vehicle driver are therefore provided for the environment.

This communication takes place over a close range, that is to say the distance between the motor vehicle 1 and the transmitter or receiver of the device 2 is not greater than 10 m-500 m, in particular not greater than 10 m-300 m. The greater the speed, the greater the signal power and the range of the sensor and the receiver should be. In the case of a parking guidance system of a parking facility which is entered at walking speed, a range of 10 m, for example, suffices. Larger distances are expedient in a traffic guidance system on a freeway. In this case, it may also be useful for the device 2 to have a plurality of transmitters and receivers distributed along the freeway or road, with the result that the motor vehicle 1 can repeatedly communicate with the same device 2 at a plurality of locations.

Some examples in which the vehicle driver signal can be used are stated below. This list of examples is not exhaustive.

1. Parking spaces can be booked or reserved in advance in the parking guidance system. The vehicle driver 3 is identified using the vehicle driver signal and is guided to a particular parking space. In this case, the personal features of the vehicle driver 3 are taken into account (for example women's parking space, disabled parking space, etc.).

2. Information devices can adapt specific information in accordance with the features contained in the vehicle driver signal (in particular language, name, sex).

3. A toll which has already been paid can be automatically determined. This system may spare the use of so-called toll collectors, for example.

4. When booking a ferry crossing or a seat for a passenger train, the vehicle driver 3 can be guided to the booked seat, on the one hand, and the fare which has already been paid can be captured, on the other hand.

5. In the case of traffic guidance systems, the vehicle driver 3 can be individually guided to his destination on the basis of the vehicle type, the vehicle size and/or the drive type.

6. A car sharing user can be guided to a parking space in the car sharing area in order to park the vehicle 1.

7. Advertising devices can select/turn off/turn on specific advertising information in accordance with the information contained in the vehicle driver signal (in particular, preferences of the vehicle driver 3, for example non-smoker, vegetarian, etc.).

Figure 5:
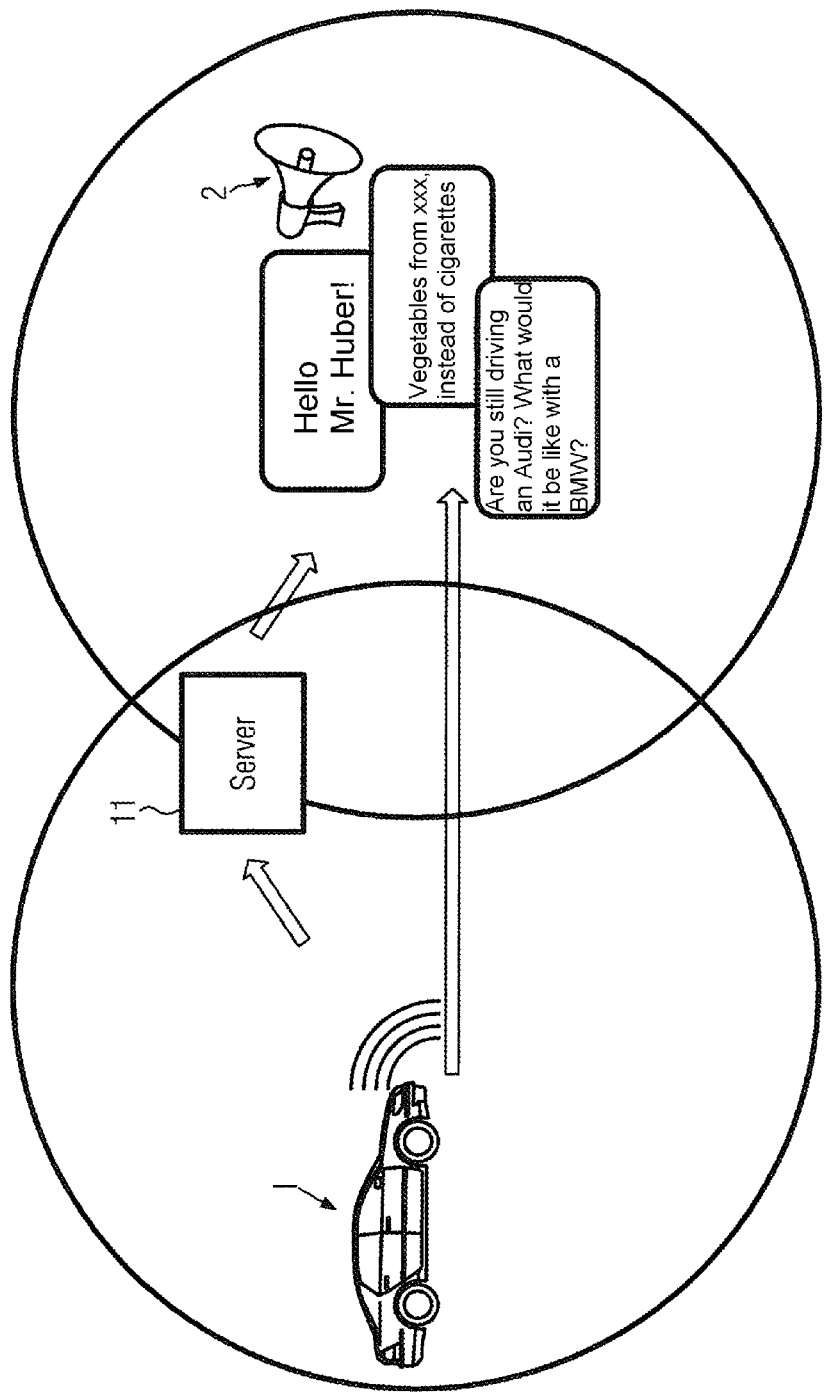
FIG. 5 schematically shows a block diagram of the principle of communication between a motor vehicle and a device according to a second exemplary embodiment of the present invention.

FIG. 5 shows a second exemplary embodiment according to the present invention with a motor vehicle 1 and a device 2. Unless stated otherwise below, this system has the same devices, features and functions as the first exemplary embodiment explained above.

The motor vehicle 1 emits at regular intervals a vehicle driver signal which is specific to the vehicle driver 3 but contains only an identification for the vehicle driver 3 via the transmitting device 9 and the antenna 10. The device 2 receives this vehicle driver signal by way of a receiver and extracts the identification number for the vehicle driver 3. This identification number can correspond to the identification number used to identify the vehicle driver 3 in his motor vehicle, but may also be another code which is assigned to the respective vehicle driver 3.

The device 2 can download particular profile data relating to the vehicle driver 3 from a server 11 using the received identification number. The server 11 also stores information relating to which device 2 or which groups of devices 2 can receive which data of the profile data.

The device 2 can individually react to the vehicle driver 3 using the profile data received from the server 11 and, in particular, can output an optical and/or acoustic signal to the vehicle driver 3.

The advantage of the second exemplary embodiment is that only simple unidirectional communication takes place from the motor vehicle 1 to the device 2 via a radio connection. The device 2 can receive the remaining profile data from the server 11 via a wired broadband line, for example. The disadvantage of this system is that the vehicle driver 3 must store the personal profile data on an independent server 11. In the first exemplary embodiment, the profile data are stored in a data memory which the vehicle driver 3 may have.

During use, the vehicle driver 3 does not notice any difference between the first exemplary embodiment and the second exemplary embodiment since, in both exemplary embodiments, the devices 2 which receive the vehicle driver identification signal can individually react to the requirements of the vehicle driver 3 or of the fellow occupants of the motor vehicle.

Figure 6:
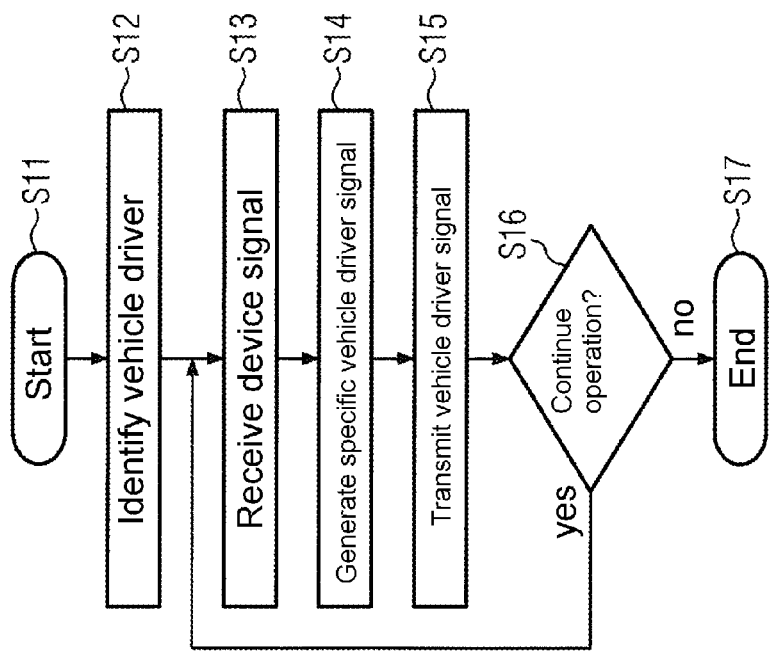
FIG. 6 is a flowchart of a simplified method.

A further, simplified method for transmitting the specific vehicle driver signal is explained below using FIG. 6, in which case the respectively corresponding steps have already been explained in detail when explaining the method illustrated in FIG. 4, with the result that this is omitted below (S1≅S11, S2≅S12, S4≅S13, S6≅S14, S7≅S15, S9≅S16, S10≅S17).

The method begins with step S11.

In step S12, the vehicle driver 3 is identified using the vehicle driver identification device 7. In step S13, an attempt is made to receive a corresponding device signal from a device 2 via the antenna 10 and the transmitting/receiving device 9 of the motor vehicle 1. This causes a device 2 to permanently transmit such a signal which is used to identify it.

If such a signal has been received, the method sequence changes to step S14 in which a vehicle driver signal specific to the vehicle driver 3 is generated. The vehicle driver signal can be individually adapted to the identified device 2.

The vehicle driver signal generated is transmitted in step S15.

In step S16, a check is carried out in order to determine whether the operation of this apparatus for electronically identifying the vehicle driver 3 using the vehicle driver signal is intended to be continued further. If this is the case, the method sequence changes to step S13 again in which a corresponding device signal is again received from a device 2.

If it is determined in step S16 that the operation of the apparatus is no longer intended to be continued, the method sequence changes to step S17 which is used to terminate the method. Step S17 is typically reached at the end of the journey.

Steps S13 and S14 can also be swapped in the order of their execution, in which case a specific vehicle driver signal is then generated in step S14 independently of the device signal received in step S13 and therefore independently of the type of device 2.

The method is typically carried out repeatedly during the entire journey duration.

LIST OF REFERENCE SYMBOLS

1 Motor vehicle
2 Device
3 Vehicle driver
4 Registration authority
5 Data memory
6 Data memory (motor vehicle)
7 Vehicle driver identification device
8 Signal generation device
9 Transmitting/receiving device
10 Antenna
11 Server The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a vehicle driver identification device that identifies a vehicle driver;
   a signal generation device that generates a signal not specific to the vehicle driver that indicates information specific to the vehicle driver is available;
   a transmitter configured to transmit the signal not specific to the vehicle driver to devices in a vicinity of the motor vehicle; and
   a receiver configured to receive a device signal from a device in the vicinity of the motor vehicle sent in response to the signal not specific to the vehicle driver, wherein the device is identified using the device signal,
   wherein the signal generation device further generates a signal specific to the vehicle driver identified with the vehicle driver identification device and is based on the identified device,
   wherein the transmitter is further configured to emit the signal specific to the vehicle driver to the identified device.

2. The motor vehicle according to claim 1, wherein the vehicle driver identification device comprises one or more of a biometric sensor, an electronic vehicle key or a radio sensor for reading an electronic identification card.

3. The motor vehicle according to claim 1, wherein the signal generation device is connected to a data memory which stores data specific to one or more vehicle drivers, and
   the signal generation device is able to read the data specific to the vehicle driver identified with the vehicle driver identification device from the data memory.

4. The motor vehicle according to claim 1, wherein the transmitter is configured to emit a radio signal, according to a predetermined standard.

5. The motor vehicle according to claim 4, wherein the predetermined standard is WLAN or Bluetooth.

6. The motor vehicle according to claim 1, wherein the receiver is configured to carry out bidirectional communication together with the transmitter.

7. A method for use in a motor vehicle equipped with a vehicle driver identification device that identifies a vehicle driver, a signal generation device that generates a signal specific to the vehicle driver identified with the vehicle driver identification device, and a transmitter usable to emit the signal specific to the vehicle driver, the method comprising the acts of:
   identifying, via the vehicle driver identification device, a vehicle driver of the motor vehicle;

generating, via the signal generation device, a signal not specific to the vehicle driver that indicates information specific to the vehicle driver is available;

transmitting, via the transmitter, the signal not specific to the vehicle driver to devices in a vicinity of the motor vehicle;

identifying, after receiving a device signal from a device in the vicinity of the motor vehicle sent in response to the signal not specific to the vehicle driver, the device using the device signal;

generating, via the signal generation device, a vehicle driver signal specific to the identified driver and is based on the identified device; and transmitting, via the transmitter, the specific vehicle driver signal to the identified device.

8. The method according to claim 7, wherein the vehicle driver signal specific to the vehicle driver is transmitted only if a predetermined device in a group of devices is identified.

9. The method according to claim 7, wherein the specific vehicle driver signal is transmitted in an encrypted form.

10. The method according to claim 8, wherein the specific vehicle driver signal is transmitted in an encrypted form.

* * * * *